(12) United States Patent
Wang (10) Patent No.: US 10,284,459 B2
(45) Date of Patent: May 7, 2019

(54) TOPOLOGY DISCOVERY IN FABRIC NETWORK

(71) Applicant: HANGZHOU H3C TECHNOLOGIES CO., LTD., Zhejiang (CN)

(72) Inventor: Jue Wang, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 183 days.

(21) Appl. No.: 15/317,379

(22) PCT Filed: May 29, 2015

(86) PCT No.: PCT/CN2015/080238
§ 371 (c)(1),
(2) Date: Dec. 8, 2016

(87) PCT Pub. No.: WO2015/188701
PCT Pub. Date: Dec. 17, 2015

(65) Prior Publication Data
US 2017/0126543 A1 May 4, 2017

(30) Foreign Application Priority Data

Jun. 12, 2014 (CN) .......................... 2014 1 0261325

(51) Int. Cl.
*H04L 12/751* (2013.01)
*H04L 12/24* (2006.01)
(Continued)

(52) U.S. Cl.
CPC .............. *H04L 45/02* (2013.01); *H04L 41/12* (2013.01); *H04L 49/357* (2013.01); *H04L 65/1073* (2013.01)

(58) Field of Classification Search
None
See application file for complete search history.

(56) References Cited

U.S. PATENT DOCUMENTS

| 2006/0256711 A1 | 11/2006 | Kusama et al. | |
| 2010/0226281 A1* | 9/2010 | Ghosh | H04L 12/56 370/254 |

(Continued)

FOREIGN PATENT DOCUMENTS

| CN | 101616029 A | 12/2009 |
| CN | 101621414 A | 1/2010 |

(Continued)

OTHER PUBLICATIONS

International Search Report and Written Opinion, International Application No. PCT/CN2015/080238, dated Jul. 24, 2015, pp. 1-11, SIPO.

(Continued)

*Primary Examiner* — Kodzovi Acolatse
(74) *Attorney, Agent, or Firm* — Hewlett Packard Enterprise Patent Department (57) ABSTRACT

An N-port virtualizer (NPV) in a Fabric network receives a register request and sends an NPV register message to an FCoE forwarder (FCF). The NPV register message comprises an identity of a device that sent the register request and forwarding history information. The forwarding history information is information describing a forwarding path of the NPV register message.

15 Claims, 5 Drawing Sheets

(51) Int. Cl.
*H04L 12/931* (2013.01)
*H04L 29/06* (2006.01)

(56) References Cited

U.S. PATENT DOCUMENTS

| | | | |
|---|---|---|---|
| 2011/0022693 A1 | 1/2011 | Cheethirala et al. | |
| 2011/0188511 A1* | 8/2011 | Di Benedetto | H04L 45/026 370/419 |
| 2011/0226936 A1* | 9/2011 | Pain | H01L 27/14603 250/214.1 |
| 2011/0228670 A1* | 9/2011 | Sasso | H04L 41/0668 370/221 |
| 2012/0110146 A1 | 5/2012 | Tian et al. | |
| 2012/0275301 A1* | 11/2012 | Xiong | H04L 49/357 370/230 |
| 2012/0275787 A1* | 11/2012 | Xiong | H04L 49/357 398/45 |
| 2013/0148663 A1* | 6/2013 | Xiong | H04L 45/745 370/392 |

FOREIGN PATENT DOCUMENTS

| | | |
|---|---|---|
| CN | 102208945 A | 10/2011 |
| CN | 102427410 A | 4/2012 |
| CN | 103607294 A | 2/2014 |
| EP | 2550780 A1 | 1/2013 |

OTHER PUBLICATIONS

International Preliminary Report on Patentability received for PCT Patent Application No. PCT/CN2015/080238, dated Dec. 22, 2016, 5 pages.

* cited by examiner

TOPOLOGY DISCOVERY IN FABRIC NETWORK

BACKGROUND

A storage area network (SAN), which may also be called a Fabric network, includes terminal systems (referred to as nodes, including servers and storage devices), and intermediate systems (referred to as switches). According to Fibre Channel (FC) protocols, a Fabric network can support a limited number, e.g. up to 239, FCoE Forwarder (FCF) switches. This restricts the size of the network. In order to overcome the restriction of 239 FCF switches, devices called N-Port Virtualizer (NPV) may be added between nodes and FCF switches. These NPVs serve as agents for the nodes to register to the Fabric network. An NPV has its F ports connected to N_Ports (i.e., Node ports) of nodes, and is treated as an FCF switch by the nodes. An NPV also has its NP ports connected to F_Ports (i.e., Fabric ports) of FCF switches, and is treated as a node by the FCF switches (also referred to as FCF). Plural NPVs may be connected in series in the network. As long as one of the NPVs is connected to an FCF switch, all of the plural NPVs and nodes served by the NPVs can register in the Fabric network via the NPV.

BRIEF DESCRIPTION OF THE DRAWINGS

Features of the present disclosure are illustrated by way of example and not limited in the following figures, in which like numerals indicate like elements, in which.

DETAILED DESCRIPTIONS

In other instances, some methods and structures have not been described in detail so as not to unnecessarily obscure the present disclosure. As used herein, the term "includes" means includes but not limited to, the term "including" means including but not limited to. The term "based on" means based at least in part on. The term "a" means one or more than one. Quantities of an element, unless specifically mentioned, may be one or a plurality of, or at least one.

In the context of this disclosure, an NPV refers to a device under an NPV mode, is set up between a node and an FCF, and is capable of obtaining an FCID for the node from the FCF. The NPV may be implemented by a switch configured to work under the NPV mode, e.g., a Top of Rack (ToR) FC switch, or an FC switch in a blade chassis, or the like. The NPV may also be implemented by a node device, e.g., a storage device or a server configured to work under the NPV mode, or the like. The storage devices and server devices may serve as nodes which access data in a Fabric network, and may also serve as NPVs to register other nodes in the Fabric. Therefore, an NPV may be a standalone device, or be hosted in a device which also carries out other functions.

Figure 1:
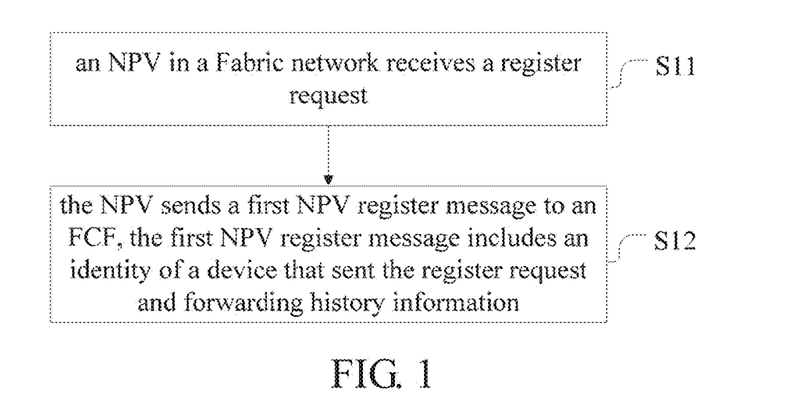
FIG. 1 is a flowchart illustrating a topology discovery process in a Fabric network in accordance with examples of the present disclosure.

FIG. 1 is a flowchart illustrating a topology discovery process in a Fabric network in accordance with examples of the present disclosure. The method may include the following procedures.

At block S11, an NPV in a Fabric network receives a register request.

At block S12, the NPV sends a first NPV register message to an FCF. The first NPV register message may include an identity of a device that sent the register request and forwarding history information. The forwarding history information describes a forwarding path of the first NPV register message.

The NPV register message refers to a message sent by an NPV to an FCF which includes information for network topology discovery. The NPV register message may be implemented by a message defined in a protocol with necessary modifications. e.g., contents of the NPV register message may be transmitted using reserved fields in a conventionally-defined message. In another example, the NPV register message may be implemented by a specially designed message. The specially designed message may adopt a message format defined in a conventional protocol, e.g., an FCoE packet format, an FIP protocol packet format, an Extended Link Service (ELS) packet format, a Register FC-4 types (RFT) packet format, etc., or adopt a specially defined message format.

The forwarding history information is information describing the forwarding history of the NPV register message, and is for topology discovery in a Fabric network. The forwarding history information may include information describing parameters of the forwarding path of the NPV register message from the NPV that initiates the message to the FCF. The parameters may include one or multiple of: a device name, a device identity, a device type of the device that initiates the NPV register message, a port name, a port identity, and the like. In an example, the forwarding history information may include information of all of devices that forwarded the NPV register message, e.g., device name, world wide name (WWN), FCID, port name, port identity of the devices, or the like. In an example, the forwarding history information may include one or multiple of all of NPVs that forwarded the NPV register message, e.g., may include information of a pre-defined number of NPVs that are first traversed by the NPV register message along the forwarding path. Besides, the forwarding history information may also include the number of hops in the forwarding path of the NPV register message.

In an example, after receiving the second NPV register message, the NPV may also update the forwarding history information in the second NPV register message, and forward the updated second NPV register message to the FCF. The second NPV register message is sent by a second NPV for a node device connected to the second NPV. The NPV may update the forwarding history information in the second NPV register message according to a pre-defined format of the forwarding history information, e.g., adding information of the NPV into the forwarding history information, and/or adding 1 to the value of the forwarding hops, and the like. In an example, the forwarding history information is defined to be information of an NPV to which a device that sent a register request is connected (also referred to as a parent NPV), the NPV that received the NPV register message may perform no processing on the NPV register message, and directly forward the NPV register message to the FCF.

As such, after receiving the NPV register message, the FCF may obtain the forwarding history information and information of a device that sent a register request corresponding to the NPV register message from the NPV register message. The FCF is enabled to conclude connection relations between the devices from the packet forwarding relations between the nodes and the NPVs after collecting information from NPV register messages sent by the NPVs for respective node devices. The FCF or a network device may obtain the topology of the Fabric network from the connection relations between the devices obtained by the FCF. Thus, the FCF or the network device may use the topology of the Fabric network during providing other services, e.g., Fabric network access control, traffic control, device backup, failure recovery, or the like.

The terms "first", "second" in the descriptions are merely for distinguishing two similar objects, and do not necessarily indicate a priority or order between the two objects.

In an example, the NPV may obtain the identity of the device from the register request. The register request may be a network login request message sent by the node, e.g., a Fabric login (Flogi), or the like. The device identity may be one or multiple of: a node name, a world wide name (WWN), a port name, and the like.

In an example, the NPV may receive a register response from the FCF, obtain an FCID of the device from the register response as the identity of the device. In an example, after receiving the Flogi, the NPV may send an Fdisc to the FCF. The FCF receiving the Fdisc may return an Fdisc Accept message which includes an FCID allocated by the FCF to the device. The NPV may obtain the FCID of the device from the Fdisc Accept as the device identity, and add the device identity into the NPV register message.

In an example, an NPV also is to send a register request to the FCF as a node device to obtain an FCID during an initiation process. The NPV during initiation may be treated the same way as a node device, i.e., a second NPV that received the register request sent by the NPV may generate an NPV register message and send the NPV register message to the FCF for the NPV without the need of finding out whether the device that sent the register request is a node device or another NPV.

In another example, an NPV may send an NPV register message only for a node device that sent a register request, i.e., the NPV may send an NPV register packet to the FCF after a determination is made that the device that sent the register request is a node device. In an example, the NPV may determine the device is a node device based on the value of a field in an RFT-ID packet sent by the device. When a node device sends an RFT-ID packet, the node device may set the value of a pre-defined field to be a pre-defined value which indicates the device is a node device. When an NPV sends an RFT-ID packet, the NPV may set the value of the pre-defined field to be a pre-defined value which indicates the device is an NPV.

In an example, an NPV may send an NPV register message for the NPV itself. The NPV register message may include an identity of the NPV and forwarding history information.

Figure 2:
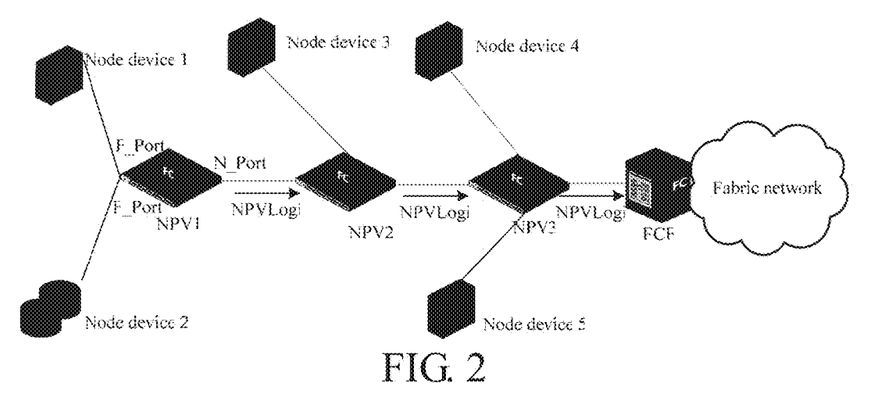
FIG. 2 is a schematic diagram illustrating a Fabric network in accordance with examples of the present disclosure.

FIG. 2 is a schematic diagram illustrating a Fabric network in accordance with examples of the present disclosure. NPV1, NPV2 and NPV3 are connected in series, and NPV3 is connected to an FCF. Node devices 1 and 2 are connected to NPV1, node device 3 is connected to NPV2, and node devices 4 and 5 are connected to NPV3. A device is connected to an FCF through an N_Port (i.e., node port), and to a node device through an F_Port. FIG. 2 only illustrates the F_Ports and N_Ports of NPV1. Ports of other devices can be identified in the same way, thus are not labeled in FIG. 2. In an example, each NPV sends NPV register messages (also referred to as NPV login or NPVLogi in the following) which include forwarding history information to the FCF for nodes connected to the NPV (including storage devices, servers, and NPVs that requests login as a node). As such, the FCF or a network device is enabled to collect all of information received, obtain information about forwarding paths between the nodes and NPVs, and then conclude the topology of the Fabric network.

Figure 3:
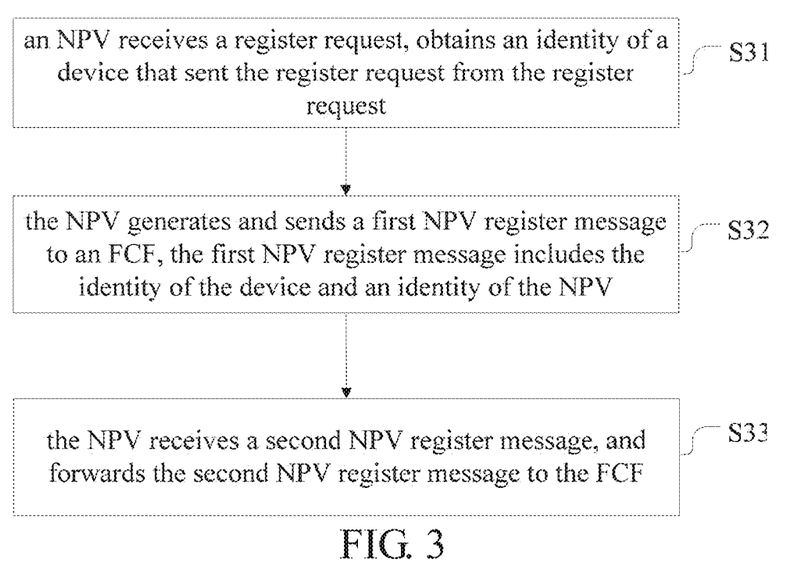
FIG. 3 is a flowchart illustrating a topology discovery process in a Fabric network in accordance with examples of the present disclosure.

FIG. 3 is a flowchart illustrating a topology discovery process in a Fabric network in accordance with examples of the present disclosure. The method may include the following procedures.

At block S31, an NPV receives a register request, and obtains an identity of a device that sent the register request.

At block S32, the NPV generates a first NPV register message, and sends the first NPV register message to the FCF. The first NPV register message may include an identity of the device and the identity of the NPV. The identity of the NPV serves as the forwarding history information in the first NPV register message.

At block S33, the NPV receives a second NPV register message, and forwards the second NPV register message to the FCF.

Taking the Fabric network shown in FIG. 2 as an example, when NPV3 joins the network, NPV3 may send a register request to the FCF (i.e., through an N-Port of the NPV3). The FCF may record the connection relation between NPV3 and the FCF.

When NPV2 joins the network, NPV2 may send a register request to the FCF. NPV3 receives the register request, and obtains the device identity of NPV2 from the register request, e.g., a node name, a WWN, or the like. NPV3 sends an NPV register message to the FCF. The NPV register message includes the device identity of NPV2 and the device identity of the parent NPV (also referred to as parent node) of NPV2, i.e., NPV3. After receiving the NPV register message, the FCF may record the connection relation between NPV2 and NPV3.

When NPV1 joins the network, NPV1 sends a register request to the FCF. NPV2 receives the register request, and obtains the device identity of NPV1 from the register request. NPV2 sends an NPV register message to the FCF. The NPV register message includes the device identity of NPV1 and the device identity of the parent NPV (, i.e., NPV2) of NPV1. NPV3 may directly forward the NPV register message to the FCF. After receiving the NPV register message, the FCF may record the connection relation between NPV1 and NPV2.

When node device 1 logs in the Fabric network, node device 1 may send a register request to the FCF. NPV1 receives the register request, obtains the device identity of node device 1 from the register request, and sends an NPV register message to the FCF. The NPV register message may include the device identity of node device 1 and the device identity of the parent NPV of node device 1 (i.e., NPV1). The NPV register message is received by the FCF after being forwarded by NPV2 and NPV3. The FCF obtains the connection relation between node device 1 and NPV1 from the NPV register message. The FCF may obtain a forwarding relation: node device 1→NPV1→NPV2→NPV3→FCF, based on the information of the forwarding path from node device 1 to the FCF obtained through the above procedures. Likewise, the FCF may also obtain the forwarding relations respectively from node devices 2, 3, 4, 5 to the FCF. The FCF may provide the forwarding relations to other FCFs or a pre-defined FCF or a pre-defined network device according to pre-set configuration information. The device that obtained those forwarding relations can obtain the topology of the whole Fabric network based on the forwarding relations.

Figure 4:
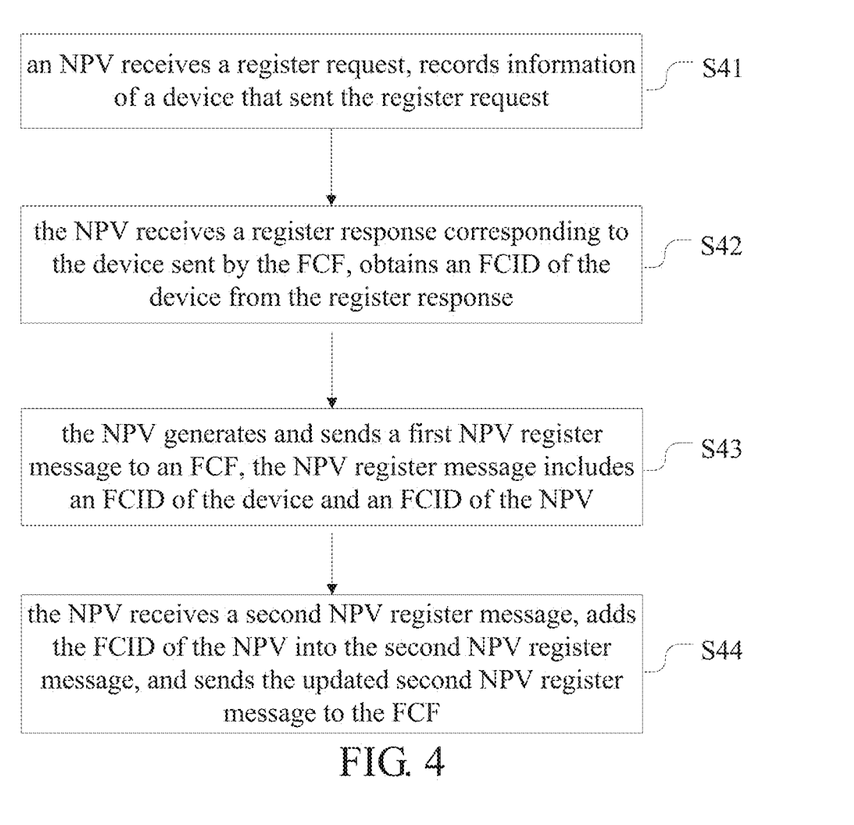
FIG. 4 is a flowchart illustrating a topology discovery process in a Fabric network in accordance with examples of the present disclosure.

FIG. 4 is a flowchart illustrating a topology discovery process in a Fabric network in accordance with examples of the present disclosure. The method may include the following procedures.

At block S41, an NPV receives a register request, and records information of a device that sent the register request.

At block S42, the NPV receives a register response message sent by an FCF for the device, and obtains an FCID of the device from the register response message.

At block S43, the NPV generates an NPV register message, and sends the NPV register message to the FCF. The NPV register message includes the FCID of the device and an FCID of the NPV.

At block S44, the NPV receives an NPV register message, adds the FCID of the NPV into the NPV register message, and sends the modified NPV register message to the FCF.

This process is similar to that shown in FIG. 3, the only difference is that the device identity is an FCID. In an example, after receiving a register request (e.g., a Flogi), an NPV makes a determination that the NPV is the parent NPV of the device that sent the Flogi, and records information of the device obtained from the Flogi, e.g., a node name, or a node name and a port name, or the like. The NPV converts the Flogi into an Fdisc, and sends the Fdisc to the FCF. After receiving the Fdisc, the FCF allocates an FCID to the device, and sends the allocated FCID to the NPV through an Fdisc Accept. The NPV identifies the FCID from the Fdisc Accept as the FCID allocated to the device by using recorded information of the device. The NPV has already obtained an FCID of the NPV from a previous similar process in which the NPV acts as a node device. Then the NPV may generate an NPV register message and send to the FCF. The NPV register message includes the FCID of the device and the FCID of the NPV.

Because an FCF is able to obtain device information, e.g., node name, port name, etc. of the devices during node register procedures, and may record a relation which associates information of a device with an FCID of the device when allocating the FCID to the device, no matter the device identities in the NPV register messages are node names, port names or FCIDs, the FCF can translate between the node names, port names and the FCIDs using the recorded relations and obtain the network topology expressed in a required form.

In an example, the forwarding history information may include device identities of all NPVs that forward the NPV. Thus, other NPVs that receive the NPV register message also need to add respective device identities into the NPV register message, and forwards the NPV register message to the FCF. Thus, the FCF may obtain information of the forwarding path from the node to the FCF from the NPV register message.

Figure 5:
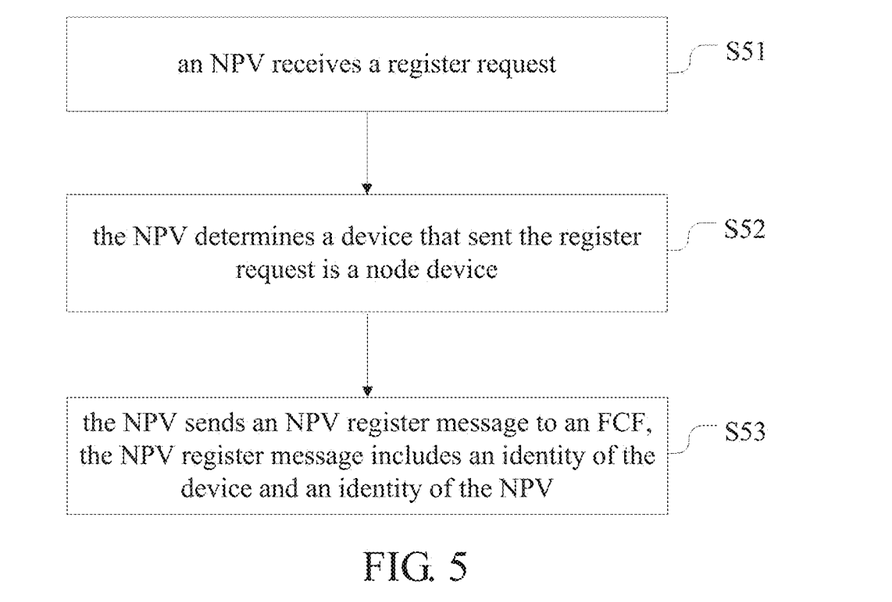
FIG. 5 is a flowchart illustrating a topology discovery process in a Fabric network in accordance with examples of the present disclosure.

FIG. 5 is a flowchart illustrating a topology discovery process in a Fabric network in accordance with examples of the present disclosure.

In this example, parent NPVs are used to describe forwarding relations between NPVs.

If a first NPV is connected to a second NPV which forwards messages from the first NPV to an FCF, the second NPV is referred to as the parent NPV of the first NPV. In the example shown in FIG. 2, NPV2 forwards messages from NPV1 to the FCF, thus is the parent NPV of NPV; NPV3 is connected to the FCF without any intermediate NPV, thus has no parent NPV. It can be seen that, an NPV and its parent NPV forms a client-proxy relation.

As shown in FIG. 5, the method may include the following procedures.

At block S51, an NPV receives a register request.

At block S52, the NPV judges whether a device that sent the register request is a node device.

At block S53, the NPV generates an NPV register message, and sends the NPV register message to an FCF. The NPV register message includes a device identity of the device and a device identity of the NPV.

In an example, the NPV may make the determination that the device is a node device (i.e., a server or a storage device, not an NPV) based on a received RFT-ID packet sent by the device. When a node device sends an RFT-ID packet, the node device may set the value of a pre-defined field to be a pre-defined value which indicates the device is a node device. When an NPV sends an RFT-ID packet, the NPV may set the value of the pre-defined field to be a pre-defined value which indicates the device is an NPV. In an example, the NPV may determine the device is a node device based on the value of the pre-defined field in the RFT-ID packet sent by the device.

The device identity of the node device may be device information obtained from the register request, e.g., node name and port name, etc., or an FCID of the node device obtained from an Fdisc Accept packet sent by the FCF.

The NPV register message for a first NPV performing registration as a node device may be sent by the parent node of the first NPV (i.e., a second NPV that received the register request sent by the first NPV) which is similar to the process described above, or may sent by the first NPV. When the first NPV send an NPV register message for the first NPV, the NPV register message may include the device identity of the first NPV and forwarding history information. When generating the NPV register message, the first NPV may set the value of the forwarding history information to be a pre-defined default value, e.g., 0xFFFFFE, NULL, or the like, and send the NPV register message to the FCF via an N_Port. Other NPVs that receive the NPV register message subsequently may update the forwarding history information in the NPV register message according to pre-defined design of the forwarding history information. In an example, when the parent NPV of the first NPV receives the NPV register message, the parent NPV may add the device identity of the parent NPV into the NPV register message as the forwarding history information, or replace the default value in the forwarding history information with the device identity of the parent NPV, and send the NPV register message to the FCF. Subsequent NPVs may directly forward the NPV register message to the FCF without performing any processing on the NPV register message. Alternatively, the subsequent NPVs may add 1 to the value of forwarding hops in the forwarding history information. In an example, the initial value of the forwarding hops in the forwarding history information may be set to be 0.

An NPV performing login as a node device may send the NPV register message for itself at any time. Device information such as node name and port name, etc. of the NPV is added into the NPV register message as the device identity of the NPV. In an example, the NPV may send the NPV register message after receiving the FCID allocated by the FCF, and add the FCID as the device identity of the NPV into the NPV register message.

In an example, information of a parent node and an NPV proxy depth in an NPV register message is updated by NPVs passed through by the NPV register message during the process of the NPV register message is forwarded from an NPV to the FCF. As such, the FCF is enabled to obtain parent node information and NPV proxy depths of all devices including node devices and NPVs, and then conclude the topology of the Fabric network using the parent node information and the NPV proxy depths.

For an NPV, the NPV proxy depth represents the number of NPVs through which the NPV logs in at the FCF. In the example shown in FIG. 2, NPV1 is connected to the FCF through NPV2 and NPV3, i.e., NPV1 needs two proxies to log in at the FCF. NPV2 is the proxy of NPV1, NPV3 is the proxy of NPV2, thus the NPV proxy depth of NPV1 is 2; NPV3 is directly connected to the FCF, i.e., NPV3 can log in at the FCF without a proxy, thus the NPV proxy depth of NPV3 is 0.

For a node device, its NPV proxy depth is identical to that of the parent NPV of the node device. In the example shown in FIG. 2, the parent NPV of node device 1 and node device 2 is NPV1 whose NPV proxy depth is 2, thus the NPV proxy depth of node device 1 and node device 2 is 2; the parent NPV of node device 4 and node device 5 is NPV3 whose NPV proxy depth is 0, thus the NPV proxy depth of node device 4 and node device 5 is 0.

Figure 6:
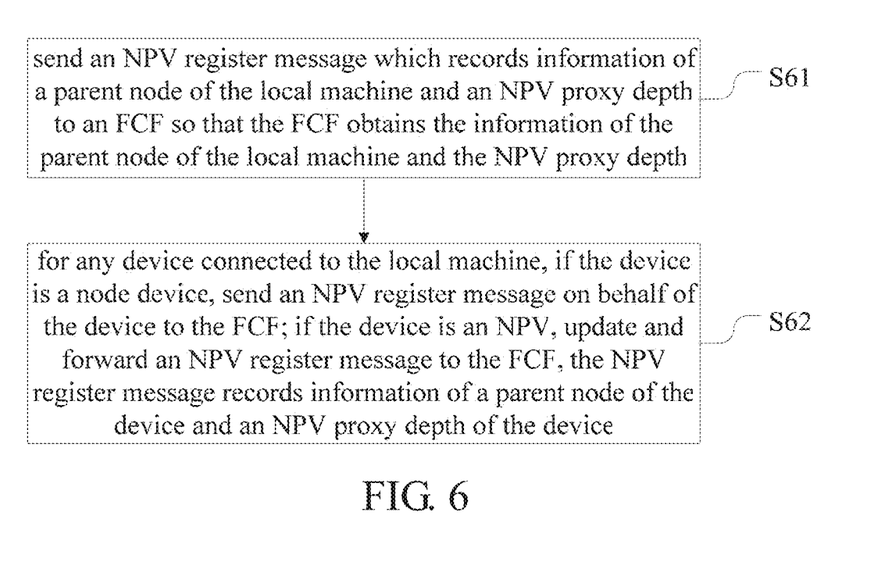
FIG. 6 is a flowchart illustrating a topology discovery process in a Fabric network in accordance with examples of the present disclosure.

FIG. 6 is a flowchart illustrating a topology discovery process in a Fabric network in accordance with an example of the present disclosure. The process is implemented by any NPV between a node device and an FCF, and may include the following procedures.

At block S61, an NPV sends an NPV register message which records information of a parent node of the NPV and an NPV proxy depth to an FCF to enable the FCF to obtain the information of the parent node and the NPV proxy depth.

At block S62, for any device connected to the NPV, if the device is a node device, the NPV sends to the FCF an NPV register message on behalf of the device which records the parent node of the device and an NPV proxy depth of the device; if the device is a second NPV, the NPV updates an NPV register message which records the parent node of the second NPV and an NPV proxy depth of the second NPV sent by the second NPV, and forwards the updated NPV register message to the FCF.

In an example, in order to specify the parent node and NPV proxy depth of each node device and each NPV in the Fabric network, an NPV register message and an NPV register response, which are both ELS packets, are introduced.

An NPV register message includes information of a parent node and an NPV proxy depth, is sent by an NPV and updated by NPVs along a forwarding path to the FCF. The NPV register message is forwarded to the FCF. The FCF obtains the information of the parent node and the NPV proxy depth, and returns an NPV register response to the sender of the NPV register message. The NPV register response may include the information of the parent node and the NPV proxy depth obtained from the NPV register message.

The NPV register response message is sent by an FCF in response to an NPV register message sent by an NPV, and includes information of the parent node and an NPV proxy depth of the sender of the NPV register message.

In an example, there are two cases an NPV may send an NPV register message.

One case is when the NPV performs NPV register for itself.

After Flogi register at an FCF, an NPV may generate an NPV register message which includes information of a parent node and an NPV proxy depth of the NPV. In the NPV register message, the information of the parent node is set to be pre-defined data (e.g., NULL, the address of a node device controller 0xFFFFFE, or the like), and the NPV proxy depth is 0. After the NPV register message is generated, the NPV sends the NPV register message through an N_Port of the NPV to the FCF to complete an NPV register process of the NPV.

The sources address of the NPV register message is an FCID of the sender of the NPV register message, and the destination address of the NPV register message is the address of the F_Port controller 0xFFFFFE.

The second case is when an NPV performs NPV register for a node device connected to the NPV.

After finding out that a device connected to the NPV is a node device, the NPV may generate an NPV register message on behalf of the node device. The NPV register message includes information of the parent node of the node device and an NPV proxy depth of the node device. The information of the parent node in the NPV register message is information of the NPV, and the NPV proxy depth is 0. After the NPV register message is generated on behalf of the node device, the NPV sends the NPV register message through an N_Port of the NPV to the FCF to complete an NPV register process of the node device.

In the above, the "on behalf of" refers to that the source address of the NPV register packet is the FCID allocated to the node device instead of the FCID of the sender of the NPV register message, and the destination address of the NPV register packet is the address of the F_Port controller 0xFFFFFE.

Since the FCF only needs the information of the parent node and the NPV proxy depth of each node device and each NPV, the NPV register message is only processed through an update of the parent node information by the first NPV along the forwarding path (i.e., the parent NPV of the sender of the NPV register message), and is processed through an update of the NPV proxy depth at each NPV along the forwarding path.

When a device connected to a first NPV is a second NPV, the first NPV may receives an NPV register message sent by the second NPV. The NPV register message may be initiated by the second NPV, or may be initiated by another NPV and forwarded by the second NPV. The first NPV may update the NPV register message and forward the NPV register message to the FCF. In an example, after receiving an NPV register message through an F_Port, the first NPV may add a pre-defined value to the NPV proxy depth in the NPV register message; if the information of the parent node in the NPV register message is pre-defined data, the first NPV may replace the pre-defined data with information of the first NPV; if the information of the parent node is not the pre-defined data, the first NPV may keep the parent node information unchanged. Then the first NPV may send the updated NPV register message through an N_Port of the first NPV.

In an example, after completing Flogi register at the FCF, a node device or an NPV may send an RFT-ID packet to the FCF specifying the device type of the device. The device type may include node device and NPV. When an FC-4 protocol type in the RFT-ID packet is set to be E5, it indicates the sender of the RFT-ID packet is an NPV; when the FC-4 protocol type is set to be 8, it indicates the sender is a node device. If a first NPV is a proxy of a second NPV instead of a node device, the first NPV may receive an NPV register message sent by the second NPV, and the first NPV may thus determine the device is an NPV.

Therefore, for any device connected to an NPV, the NPV may determine that the device is a node device after receiving an RFT-ID packet sent by the device which specifies the device as a node device through an F_Port of the NPV, or determine that the device is an NPV after receiving an NPV register message sent by the device or an RFT-ID packet sent by the device specifying the device is an NPV.

In the example shown in FIG. 6, after the NPV sends through an N-Port of the NPV to the FCF an NPV register message which records information of a parent node of the NPV and an NPV proxy depth of the NPV, the NPV may receive an NPV register response returned by the FCF, obtain information of the parent node of the NPV and the NPV proxy depth of the NPV from the NPV register response.

In the example shown in FIG. 2, node devices 1-5, NPV1, NPV2, NPV3 all perform Flogi register at the FCF as node devices.

After NPV1 finishes Flogi register, NPV1 generates an NPV register message in which the parent node information is NULL, the NPV proxy depth is 0, and sends the NPV register message through an N_Port of NPV1. The NPV register message is received by NPV2. NPV2 updates the parent node information in the NPV register message to be NPV2, and the NPV proxy depth to be 1, and sends the updated NPV register message through an N_Port of NPV2. NPV3 detects the parent node information in the NPV register message is not a pre-defined default value, makes a determination that NPV3 is not the parent node of NPV1, thus only updates the NPV proxy depth in the NPV register message to be 2. The FCF receives the NPV register message, and obtains information that the parent node of NPV1 is NPV2, and the NPV proxy depth of NPV1 is 2.

NPV1 obtains the device type of node device 1, generates an NPV register message on behalf of node device 1, and sends the NPV register message through an N-Port of the NPV1. In the NPV register message, parent node information indicates NPV1, and a NPV proxy depth is 0. The NPV register message is received by NPV2. NPV2 updates the NPV proxy depth to be 1, and sends the updated NPV register message through an N_Port of NPV2. The NPV register message is received by NPV3. NPV3 updates the NPV proxy depth to be 2, and sends the updated NPV register message through an N_Port of NPV3. The FCF receives the NPV register message, and obtains information that the parent node of node device 1 is NPV1, and the NPV proxy depth of node device 1 is 2. Likewise, the FCF can obtain information that the parent node of node device 2 is NPV1, the NPV proxy depth of node device 2 is 2.

After Flogi register, NPV3 generates an NPV register message, and sends the NPV register message through an N_Port of NPV3. In the NPV register message, the information of a parent node is NULL, an NPV proxy depth is 0.

NPV3 obtains the device type of node device 4, generates an NPV register message on behalf of node device 4, and sends the NPV register message through an N-Port of NPV3. In the NPV register message, parent node information indicates NPV3, and a NPV proxy depth is 0. The FCF receives the NPV register message, and obtains information that the parent node of node device 4 is NPV3, and the NPV proxy depth of node device 4 is 0.

As such, the FCF can obtain parent node information and NPV proxy depths of node devices 1-5, NPV1, NPV2 and NPV3, determine that node devices 1 and 2 are connected to NPV1, node device 3 and NPV1 are connected to NPV2, node devices 4 and 5 and NPV2 are connected to NPV3, and NPV3 is directly connected to the FCF.

Figure 7:
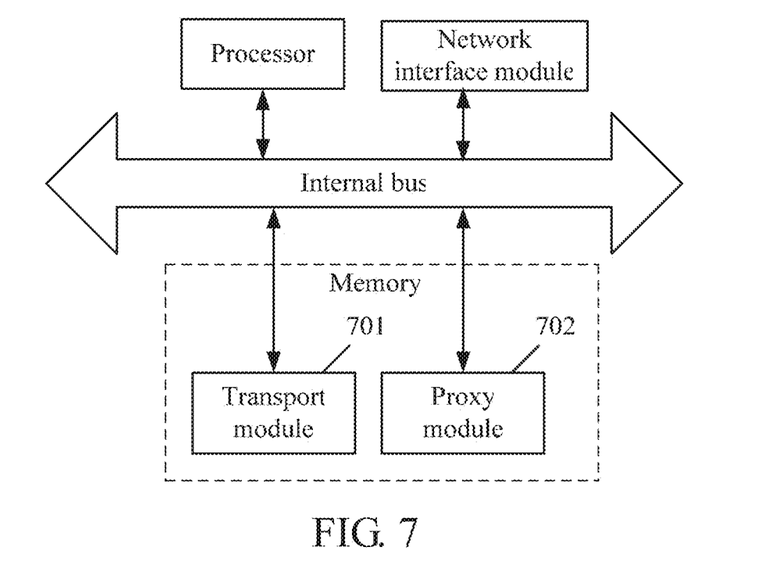
FIG. 7 is a schematic diagram illustrating an apparatus for topology discovery in a Fabric network in accordance with examples of the present disclosure.

FIG. 7 is a schematic diagram illustrating an apparatus for topology discovery in a Fabric network in accordance with examples of the present disclosure. The apparatus includes a processor and a memory. The memory includes a transport module 701 and a proxy module 702.

The transport module 701 includes a series of machine-readable instructions, when executed, capable of making the processor to receive a register request.

The proxy module 702 includes a series of machine-readable instructions, when executed, capable of making the processor to send an NPV register message to an FCF. The NPV register message may include an identity of a device that sent the register request and forwarding history information. The forwarding history information is information describing a forwarding path of the NPV register message.

The machine-readable instructions can make the processor to obtain the identity of the device from the register request: or receives a register response sent by the FCF and obtains an FCID of the device from the register response as the identity of the device.

The memory may also include an update module (not shown). The update module includes a series of machine-readable instructions, when executed, capable of making the processor to receive a second NPV register message, update forwarding history information in the second NPV register message, and forward the updated second NPV register message to the FCF. The process of updating the forwarding history information in the second NPV register message may include: adding an identity of the NPV into the forwarding history information; or adding 1 to a value of an NPV proxy depth in the forwarding history information. The NPV proxy depth represents the number of NPVs passed through by the second NPV register message.

The apparatus may also include a network interface module for communication with other devices in the Fabric network. The apparatus may also include an internal bus for transmitting information between the modules.

Figure 8:
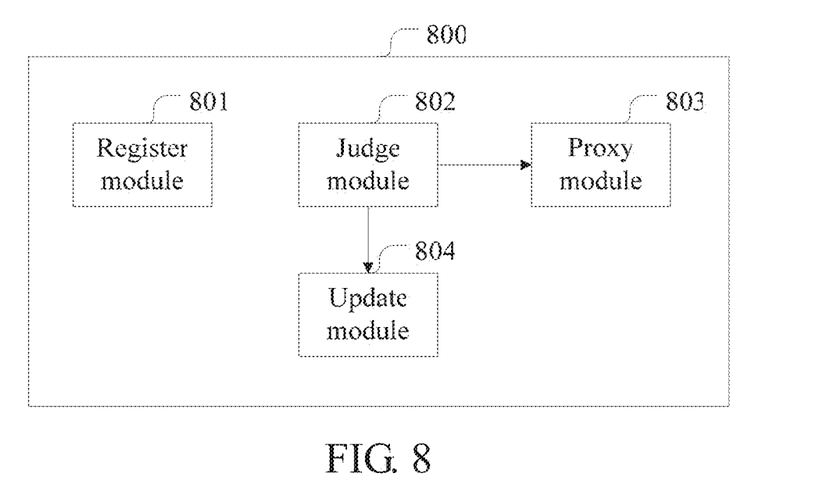
FIG. 8 is a schematic diagram illustrating an apparatus for topology discovery in a Fabric network in accordance with examples of the present disclosure.

FIG. 8 is a schematic diagram illustrating an apparatus 800 for topology discovery in a Fabric network in accordance with examples of the present disclosure. The apparatus 800 is implemented by any NPV between a node device and an FCF, and may include a register module 801, a judge module 802, a proxy module 803 and an update module 804.

The register module 801 is to sends an NPV register message which records information of a parent node of the apparatus and an NPV proxy depth to an FCF to enable the FCF to obtain the information of the parent node and the NPV proxy depth of the apparatus.

The judge module 802 is to judge whether a device connected to the apparatus is a node device or an NPV.

The proxy module 803 is to send an NPV register message on behalf of the device to the FCF when the judge module determines the device is a node device. The NPV register message includes information of a parent node and an NPV proxy depth of the device.

The update module 804 is to update and forward an NPV register message sent by the device to the FCF when the judge module 802 determines the device is an NPV. The NPV register message includes information of a parent node and an NPV proxy depth of the device.

The register module 801 may generate an NPV register message in which the information of a parent node is pre-defined information and the NPV proxy depth is 0 after finishing Flogi register, and send the NPV register message through an N-Port of the apparatus.

The proxy module 803 may generate an NPV register message in which the information of a parent node is information of the apparatus and the NPV proxy depth is 0 when sending an NPV register message on behalf of the device, and send the NPV register message through an N-Port of the apparatus.

The update module 804 may receive the NPV register message sent by the device via an F_Port, adding a pre-defined value to the NPV proxy depth in the NPV register message; if the information of a parent node in the NPV register message is pre-defined information, update the information of the parent node to be the information of the apparatus; if the information of the parent node in the NPV register message is not the pre-defined information, keep the information of the parent node unchanged; send the updated NPV register message through an N-Port of the apparatus.

The judge module 802 may, for any device connected to the apparatus, determine that the device is a node device after receiving an RFT-ID packet sent by the device which specifies the device as a node device through an F_Port, or determine that the device is an NPV after receiving an NPV register message sent by the device or an RFT-ID packet sent by the device specifying the device is an NPV.

After sending the NPV register message to the FCF, the register module 801 may receive an NPV register response returned by the FCF, obtains information of a parent node of the apparatus and an NPV proxy depth of the apparatus from the NPV register response.

The NPV register message and the NPV register response may be ELS packets.

In the NPV register message which includes information of a parent node of the apparatus and an NPV proxy depth of the apparatus sent by the register module 801 to the FCF, the source address is an FCID allocated to the apparatus, and the destination address is an address of an F_port controller 0xFFFFFE.

In the NPV register message generated by the proxy module 803 on behalf of a node device, the source address is an FCID of the node device, and the destination address the address of the F_Port controller 0xFFFFFE.

It should be understood that in the above processes and structures are just examples and may be varied for example by missing out some of the procedures or modules. The order of the procedures is not fixed, and can be adjusted according to the needs. The modules are defined based on function simply for facilitating description. In implementation, a module may be implemented by multiple modules, and functions of multiple modules may be implemented by the same module. The modules may reside in the same device or distribute in different devices. The "first", "second" in the above descriptions are merely for distinguishing two similar objects, and have no substantial meanings.

In various examples, the modules, units and processes described above hardware may be implemented by dedicated hardware or general-purpose hardware executing machine-readable instruction, or a combination of both. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A module may also comprise programmable logic or circuitry (e.g., as encompassed within a general-purpose processor or other programmable processor) that is temporarily configured by software to perform certain operations. When implemented by general-purpose hardware, they may be for example implemented by a processor executing machine readable instructions stored in a non-transitory storage medium. The term "a processor" should be interpreted to mean one processor or more than one processor.

The machine-readable instructions corresponding to modules as shown in FIG. 7 may cause an operating system running in a computer to implement part or all of the operations described herein. A non-transitory computer-readable storage medium may be a storage device in an extension board inserted in the computer or a storage in an extension unit connected to the computer. In this example, a CPU in the extension board or the extension unit executes at least part of the operations according to the instructions based on the machine readable instructions to realize the technical scheme of any of the above examples.

The non-transitory computer-readable storage medium for storing the machine readable instructions may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. In some examples, the program code may be downloaded from a server computer via a communication network.

The scope of the claims should not be limited by the specific examples, but should be given the broadest interpretation consistent with the description as a whole.

The invention claimed is:

1. A method of topology discovery in a Fabric network, comprising:
    receiving, by an N-port virtualizer (NPV) in a Fabric network, a register request;
    receiving, by the NPV, a Register FC-4 types identity (RFT-ID) packet sent by a device that sent the register request;
    determining that the device is a node device based on a value of a pre-defined field in the RFT-ID packet; and
    sending an NPV register message to an FCoE forwarder (FCF) after making the determination that the device is the node device, the NPV register message comprising an identity of the device that sent the register request and forwarding history information, wherein the forwarding history information is information describing a forwarding path of the NPV register message.

2. The method of claim 1, further comprising:
    obtaining, by the NPV, the identity of the device from the register request; or
    receiving, by the NPV, a register response from the FCF, obtaining an FCID of the device from the register response as the identity of the device.

3. The method of claim 1, further comprising:
    receiving, by the NPV, a second NPV register message, updating forwarding history information in the second NPV register message, and forwarding the updated second NPV register message to the FCF.

4. The method of claim 3, wherein the updating the forwarding history information in the second NPV register message comprises:

adding an identity of the NPV into the forwarding history information; or adding 1 to a value of an NPV proxy depth in the forwarding history information, the NPV proxy depth representing the number of NPVs passed through by the second NPV register message.

5. The method of claim 1, further comprising:

generating a third NPV register message which includes an identity of the NPV and forwarding history information, and sending the third NPV register message to the FCF.

6. An N-port virtualizer (NPV) for topology discovery in a Fabric network, comprising a processor and a non-transitory storage medium storing machine-readable instructions that are executable by the processor to:

receive a register request;

receive a Register FC-4 types identity (RFT-ID) packet sent by a device that sent the register request;

determine that the device is a node device based on a value of a pre-defined field in the RFT-ID packet; and send an NPV register message to an FCoE forwarder (FCF) after making the determination that the device that sent the register request is a node device, the NPV register message comprising an identity of a device that sent the register request and forwarding history information, wherein the forwarding history information is information describing a forwarding path of the NPV register message.

7. The NPV of claim 6, wherein the machine-readable instructions are further to:

obtain the identity of the device from the register request; or receive a register response from the FCF, obtain an FCID of the device from the register response as the identity of the device.

8. The NPV of claim 6, wherein the machine-readable instructions are to:

receive a second NPV register message, update forwarding history information in the second NPV register message, and forward the updated second NPV register message to the FCF.

9. The NPV of claim 8, wherein the updating the forwarding history information in the second NPV register message comprises: adding an identity of the NPV into the second NPV register message, or adding 1 to a value of an NPV proxy depth in the forwarding history information, the NPV proxy depth representing the number of NPVs passed through by the second NPV register message.

10. The NPV of claim 6, wherein the machine-readable instructions are further to:

generate a third NPV register message which includes an identity of the NPV and forwarding history information, and sending the third NPV register message to the FCF.

11. A non-transitory storage medium storing machine-readable instructions that are executable by a processor to:

receive a register request in a Fabric network;

receive a Register FC-4 types identity (RFT-ID) packet sent by a device that sent the register request;

determine that the device is a node device based on a value of a pre-defined field in the RFT-ID packet; and send an NPV register message to an FCoE forwarder (FCF) after making the determination that the device is the node device, the NPV register message comprising an identity of a device that sent the register request and forwarding history information, wherein the forwarding history information is information describing a forwarding path of the NPV register message.

12. The non-transitory storage medium of claim 11, the machine-readable instructions executable by the processor to:

obtain the identity of the device from the register request; or receive a register response from the FCF, obtaining an FCID of the device from the register response as the identity of the device.

13. The non-transitory storage medium of claim 11, the machine-readable instructions executable by the processor to:

receive a second NPV register message, updating forwarding history information in the second NPV register message, and forwarding the updated second NPV register message to the FCF.

14. The non-transitory storage medium of claim 13, the machine-readable instructions executable by the processor to: add an identity of the NPV into the forwarding history information; or add 1 to a value of an NPV proxy depth in the forwarding history information, the NPV proxy depth representing the number of NPVs passed through by the second NPV register message.

15. The non-transitory storage medium of claim 11, the machine-readable instructions executable by the processor to:

generate a third NPV register message which includes an identity of the NPV and forwarding history information, and sending the third NPV register message to the FCF.

* * * * *